(12) United States Patent
Pappalardo

(10) Patent No.: US 9,981,232 B2
(45) Date of Patent: May 29, 2018

(54) RECONFIGURABLE MIXING BAFFLE FOR STATIC MIXER AND METHOD FOR MAKING A STATIC MIXER

(71) Applicant: Nordson Corporation, Westlake, OH (US)

(72) Inventor: Matthew E. Pappalardo, Ewing, NJ (US)

(73) Assignee: Nordson Corporation, Westlake, OH (US)

( * ) Notice: Subject to any disclaimer, the term of this patent is extended or adjusted under 35 U.S.C. 154(b) by 511 days.

(21) Appl. No.: 14/859,937

(22) Filed: Sep. 21, 2015

(65) Prior Publication Data

US 2016/0016130 A1 Jan. 21, 2016

Related U.S. Application Data

(63) Continuation of application No. 13/658,948, filed on Oct. 24, 2012, now Pat. No. 9,242,214.

(Continued)

(51) Int. Cl.
*B01F 5/06* (2006.01)
*B01F 15/00* (2006.01)
(Continued)

(52) U.S. Cl.
CPC .......... *B01F 5/0617* (2013.01); *B01F 5/0602* (2013.01); *B01F 5/0619* (2013.01);
(Continued)

(58) Field of Classification Search
CPC .... B01F 5/0602; B01F 5/0611; B01F 5/0612; B01F 5/0616; B01F 5/0617; B01F 5/0618;
(Continued)

(56) References Cited

U.S. PATENT DOCUMENTS

| 3,743,250 A | 7/1973 | Fitzhugh, Jr. et al. |
| 3,783,938 A | 1/1974 | Chartet |

(Continued)

FOREIGN PATENT DOCUMENTS

| DE | 1939668 U | 6/1966 |
| EP | 0655275 A1 | 5/1995 |

(Continued)

OTHER PUBLICATIONS

Japanese Application No. 2014-539991: Notification Reasons for Refusal dated Jun. 30, 2016.

(Continued)

*Primary Examiner* — Walter D. Griffin
*Assistant Examiner* — Marc C Howell
(74) *Attorney, Agent, or Firm* — BAKER & HOSTETLER LLP

(57) ABSTRACT

A mixing baffle for mixing a fluid flow in a static mixer includes a mixing element support structure extending along a longitudinal direction and a first set of moveable mixing elements coupled to the mixing element support structure. The first set of moveable mixing elements is formed in a first configuration and moves to a second configuration when the mixing baffle is inserted into a tubular conduit. In the second configuration, the first set of moveable mixing elements is optimized for mixing fluids and defines a plurality of undercuts that are difficult to mold. The mixing baffle may also include a second set of stationary mixing elements that interlace with the first set of moveable mixing elements when the first set of moveable mixing elements moves to the second configuration.

28 Claims, 11 Drawing Sheets

Related U.S. Application Data

(60) Provisional application No. 61/553,575, filed on Oct. 31, 2011.

(51) Int. Cl.
   *B29C 45/44* (2006.01)
   *B29K 23/00* (2006.01)

(52) U.S. Cl.
   CPC ...... *B01F 5/0641* (2013.01); *B01F 15/00928* (2013.01); *B29C 45/44* (2013.01); *B01F 2005/0637* (2013.01); *B29K 2023/12* (2013.01); *Y10T 29/4998* (2015.01)

(58) Field of Classification Search
   CPC ................. B01F 5/0619; B01F 5/0641; B01F 2005/0637
   USPC ................................. 366/336, 337, 338, 340
   See application file for complete search history.

(56) References Cited

U.S. PATENT DOCUMENTS

| | | |
|---|---|---|
| 3,837,396 A | 9/1974 | Newton |
| 3,903,962 A | 9/1975 | Newton |
| 4,220,416 A | 9/1980 | Brauner et al. |
| 4,265,275 A | 5/1981 | Heller et al. |
| 4,497,751 A | 2/1985 | Pluss |
| 4,826,089 A | 5/1989 | Psaltopoulos |
| 4,878,624 A | 11/1989 | Psaltopoulos |
| 4,899,812 A | 2/1990 | Altoz |
| 5,378,063 A | 1/1995 | Tsukada |
| 5,492,408 A | 2/1996 | Alfare |
| 5,520,460 A | 5/1996 | Lantz |
| 6,478,133 B1 | 11/2002 | Woignier et al. |
| 8,360,630 B2 | 1/2013 | Schneider |

FOREIGN PATENT DOCUMENTS

| | | |
|---|---|---|
| EP | 1815904 A1 | 8/2007 |
| JP | S50004647 | 1/1975 |
| JP | S5755529 A | 4/1982 |
| JP | S621905 | 1/1987 |
| JP | H05025313 | 2/1993 |
| JP | H06077822 U | 11/1994 |
| JP | H9141041 | 6/1997 |
| JP | 2002520145 A | 7/2002 |
| WO | 9900180 A1 | 1/1999 |
| WO | 0003763 A1 | 1/2000 |

OTHER PUBLICATIONS

European Patent Office, International Search Report and Written Opinion in PCT Application No. PCT/US2012/061835, dated Feb. 18, 2013.

The International Bureau of WIPO, International Preliminary Report on Patentability in PCT Application No. PCT/US2012/061835, dated May 15, 2014.

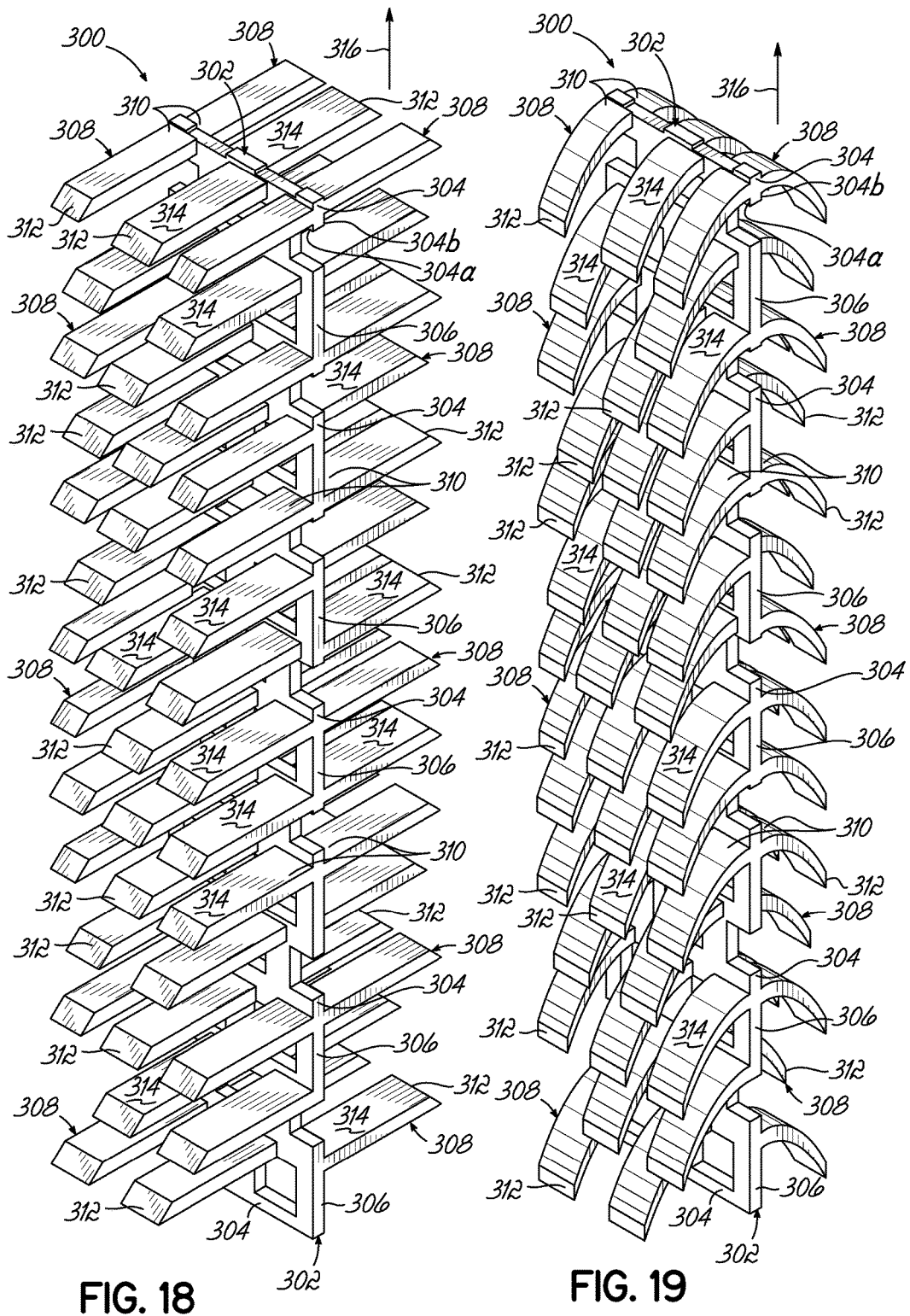

RECONFIGURABLE MIXING BAFFLE FOR STATIC MIXER AND METHOD FOR MAKING A STATIC MIXER

CROSS-REFERENCE TO RELATED APPLICATIONS

This application is a continuation of application Ser. No. 13/658,948, filed Oct. 24, 2012 (pending) which claims the benefit of Provisional Application Ser. No. 61/553,575, filed Oct. 31, 2011, the disclosures of which are hereby incorporated by reference herein.

FIELD OF THE INVENTION

The present invention generally relates to a fluid dispenser and more particularly, to components of a static mixer

BACKGROUND

A number of motionless mixer types exist, such as Multiflux, helical and others. These mixer types, for the most part, implement the same general principle to mix fluids together in a fluid dispenser. In these mixers, fluids are mixed together by dividing and recombining the fluids in an overlapping manner. This action is achieved by forcing the fluid over a series of mixing baffles of alternating geometry. Such division and recombination causes the layers of the fluids being mixed to thin and eventually diffuse past one another. This mixing process has proven to be very effective, especially with high viscosity fluids. One exemplary type of static mixer includes a series of alternating mixing baffles, of varying geometries, such as right-handed and left-handed mixing baffles disposed in a conduit to perform the continuous division and recombination.

These types of mixers are generally effective in mixing together most of the mass fluid flow, but a high number of mixing baffles must be provided to thoroughly mix the fluids, thereby increasing the overall length of the mixer. This additional length is undesirable because the fluid dispenser with a long static mixer may not be compact enough for certain dispensing operations. In order to shorten the static mixer, newer mixing baffles have been developed that include a higher number of intersecting blades or plates that form a lattice for simultaneously dividing the mass fluid flow into many more than two portions. These mixing baffles mix the mass fluid flow more rapidly and therefore enable the static mixer to be shortened considerably.

However, mixing baffles with a high number of intersecting blades are more difficult to manufacture. For example, U.S. Pat. No. 4,220,416 to Brauner et al. describes a mixing baffle molded as two V-shaped comb-like portions molded separately and intermeshed with each other before insertion into the conduit of the static mixer. The high number of intersections between blades in these mixing baffles defines a significant number of undercuts that are not moldable without specialty molding equipment or are impossible to mold. Even if these mixing baffles are molded, each mixing baffle must be molded separately rather than being molded as part of a unitary baffle stack, which is common in the static mixer field. As a result, the manufacture and assembly of each separate mixing baffle and the conduit to form a static mixer is complex, costly, and time-consuming.

Additionally, each manufactured mixing baffle must conform to a tight tolerance to properly fit within the conduit while providing a frictional fit with the conduit. Without molding each mixing baffle as a unitary baffle stack, tolerance inconsistencies between mixing baffles can make assembly of the various mixing baffles into the conduit difficult, if not impossible. Thus, it would be desirable to address some of the problems associated with manufacturing static mixers including these mixing baffles with a high number of undercuts.

SUMMARY OF THE INVENTION

According to the invention, a mixing baffle for mixing a fluid flow in a static mixer includes a mixing element support structure extending along a longitudinal direction. The mixing baffle also includes a first set of moveable mixing elements coupled to the mixing element support structure. The first set of moveable mixing elements is formed in a first configuration. When the mixing baffle is inserted into a tubular conduit, the first set of moveable mixing elements moves to a second configuration.

In one aspect, the first set of moveable mixing elements is angled from the longitudinal direction at a first angle in the first configuration, and the first set of moveable mixing elements is angled from the longitudinal direction at a second angle smaller than the first angle in the second configuration. For example, the first set of moveable mixing elements may be perpendicular to the longitudinal direction in the first configuration and angled at an acute angle from the longitudinal direction in the second configuration. In addition, each of the first set of moveable mixing elements is sized to elastically deform or otherwise move from the first configuration to the second configuration when positioned in a tubular conduit. Each of the first set of moveable mixing elements may be generally planar in the first configuration and generally non-planar in the second configuration. Each of the first set of moveable mixing elements includes an inner end connected to the mixing element support structure and a chamfered outer end configured to frictionally engage the tubular conduit.

In another aspect, the mixing baffle further includes a second set of stationary mixing elements coupled to the mixing element support structure. The second set of stationary mixing elements is not interlaced with the first set of moveable mixing elements in the first configuration, but meshes together with the first set of moveable mixing elements in the second configuration to form a lattice structure. In this regard, the first set of moveable mixing elements defines a plurality of undercuts in the second configuration, which would render the mixing element difficult to mold in the second configuration. The mixing baffle is manufactured from a non-metallic material such that the first set of moveable mixing elements is readily moved or deformed during placement in the second configuration.

In another embodiment, a static mixer for mixing a fluid flow includes a tubular conduit and at least one mixing baffle inserted into the tubular conduit. The mixing baffle includes a mixing element support structure extending along a longitudinal direction and a first set of moveable mixing elements coupled to the mixing element support structure. The first set of moveable mixing elements is formed in a first configuration. When the mixing baffle is inserted into a tubular conduit, the first set of moveable mixing elements moves to a second configuration.

The mixing baffle may be molded in series with at least one additional baffle as a unitary baffle stack. In one aspect, at least one of the additional baffles is a different type of baffle than the mixing baffle. In another aspect, at least one of the additional baffles is oriented at a different angle than the mixing baffle. The tubular conduit of the static mixer includes an inner diameter, and each of the first set of moveable mixing elements defines an element length. The element length is longer than half of the inner diameter of the tubular conduit, which forces the first set of moveable elements to pivot or deform to the second configuration when inserted into the tubular conduit.

In another embodiment, a static mixer for mixing a fluid flow includes a tubular conduit defining an inner diameter and at least one mixing baffle inserted into the tubular conduit. The mixing baffle includes a longitudinal bar extending along a longitudinal direction and a first set of mixing elements pivotally coupled to the longitudinal bar. Each of the first set of mixing elements defines an element length that is longer than half of the inner diameter of the tubular conduit. Therefore, the first set of moveable elements must pivot or deform when inserted into the tubular conduit. The first set of mixing elements is pivotally coupled to the longitudinal bar so as to enable pivoting movement of the first set of mixing elements towards or away from the longitudinal direction.

In yet another embodiment, a method of manufacturing a static mixer includes molding at least one mixing baffle. The mixing baffle includes a mixing element support structure extending along a longitudinal direction and a first set of moveable mixing elements with a first configuration. The first set of moveable mixing elements is configured to move to a second configuration when the mixing baffle is inserted into a tubular conduit.

For example, the mixing elements may be formed entirely from a deformable plastic material that is also thin enough to deform as the baffle is inserted. Alternatively, mixing elements may be formed with living hinge structures that allow pivotal movement of the mixing elements even though portions thereof are rigid. The first set of moveable mixing elements is optimized for mixing fluids and defines a plurality of undercuts in the second configuration.

In still another embodiment, a method of manufacturing a static mixer includes molding at least one mixing baffle. The mixing baffle includes a mixing element support structure extending along a longitudinal direction and a first set of moveable mixing elements with a first configuration. The method also includes inserting the mixing baffle into a tubular conduit and moving the first set of moveable mixing elements from the first configuration to a second configuration as the mixing baffle is inserted into the tubular conduit.

Another method of assembling a static mixer includes inserting at least one mixing baffle having a plurality of mixing elements into a conduit. While inserting the mixing baffle, at least some of the mixing elements may be moved into a mixing configuration. To this end, the mixing baffle may be molded in a first configuration optimized for molding processes and then used in a second configuration optimized for mixing fluids.

These and other objects and advantages of the invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 18 is a perspective view of a mixing baffle according to yet another embodiment of the current invention, the mixing baffle positioned in a first configuration; and FIG. 19 is a perspective view of the mixing baffle of FIG. 18 positioned in a second configuration optimized for mixing.

DETAILED DESCRIPTION OF THE ILLUSTRATIVE EMBODIMENTS

Figure 1:
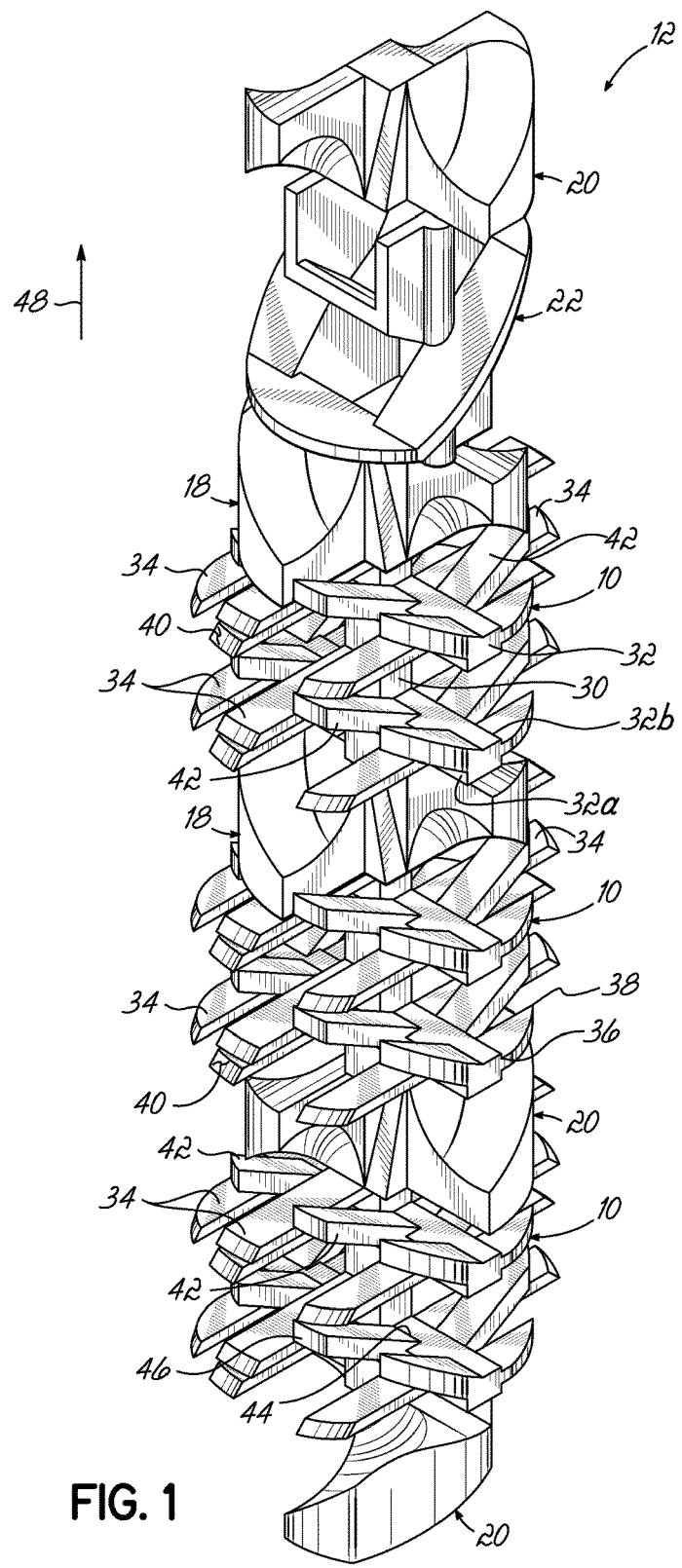
FIG. 1 is a perspective view of a baffle stack including a mixing baffle according to one embodiment of the current invention.

Referring to FIGS. 1-9, a reconfigurable mixing baffle 10 in accordance with one embodiment of the invention is incorporated into a baffle stack 12 that is configured to be inserted into a tubular conduit 14 to form a static mixer 16 as described in greater detail below. In the illustrated embodiment, the baffle stack 12 is molded as a unitary member including at least one conventional left-handed mixing baffle 18, at least one conventional right-handed mixing baffle 20, a conventional cross flow inversion baffle 22, and a plurality of the reconfigurable mixing baffles 10. Each of the conventional baffles 18, 20, 22 illustrated in this embodiment of the baffle stack 12 is fully described in U.S. Pat. No. 7,985,020 to Pappalardo, which is assigned to the assignee of the current invention. It will be appreciated that the number and ordering of these various baffles 10, 18, 20, 22 may be modified in other embodiments of a baffle stack without departing from the scope of the current invention. Additionally, other types of conventional moldable mixing baffles may be incorporated with the baffle stack as desired. The various baffles making up the baffle stack 12 could alternatively be separately molded and coupled together in other embodiments of the invention.

Figure 3:
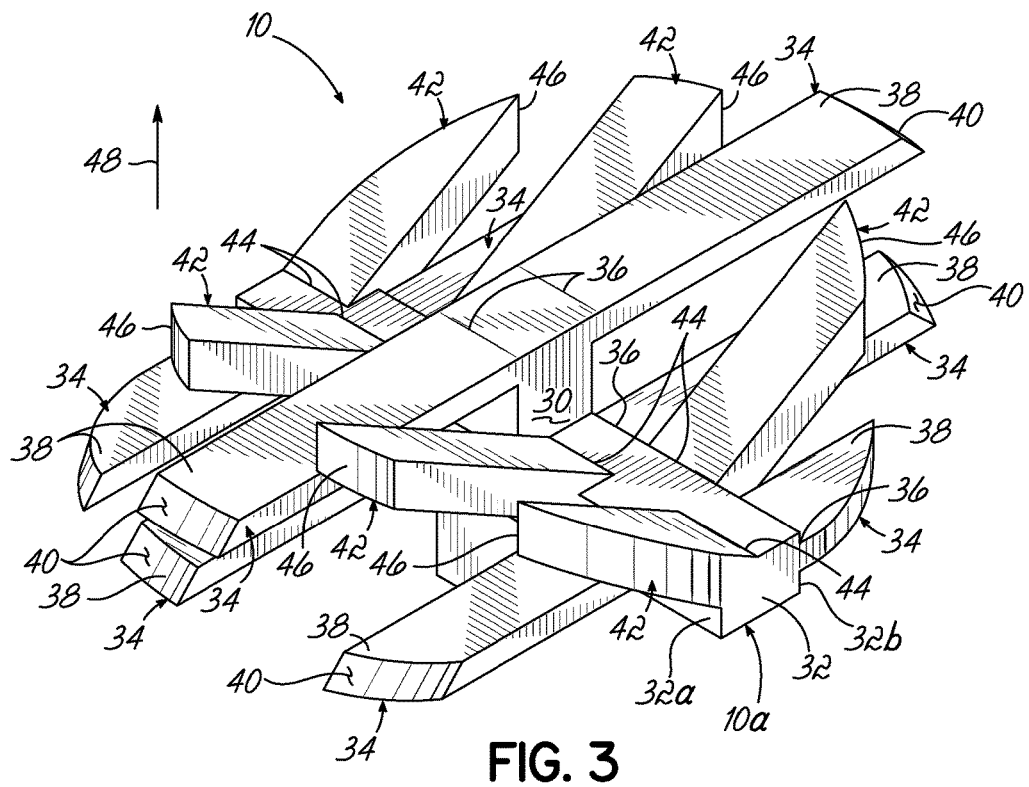
FIG. 3 is a perspective view of at least a portion of the mixing baffle of FIG. 1, removed from the other baffles in the baffle stack and positioned in a first configuration.
Figure 4:
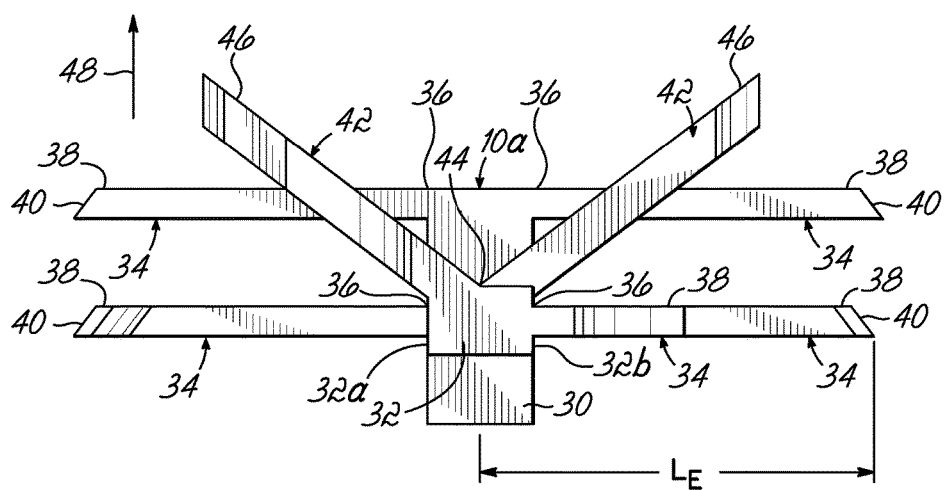
FIG. 4 is a side view of the mixing baffle of FIG. 3 in the first configuration.
Figure 5:
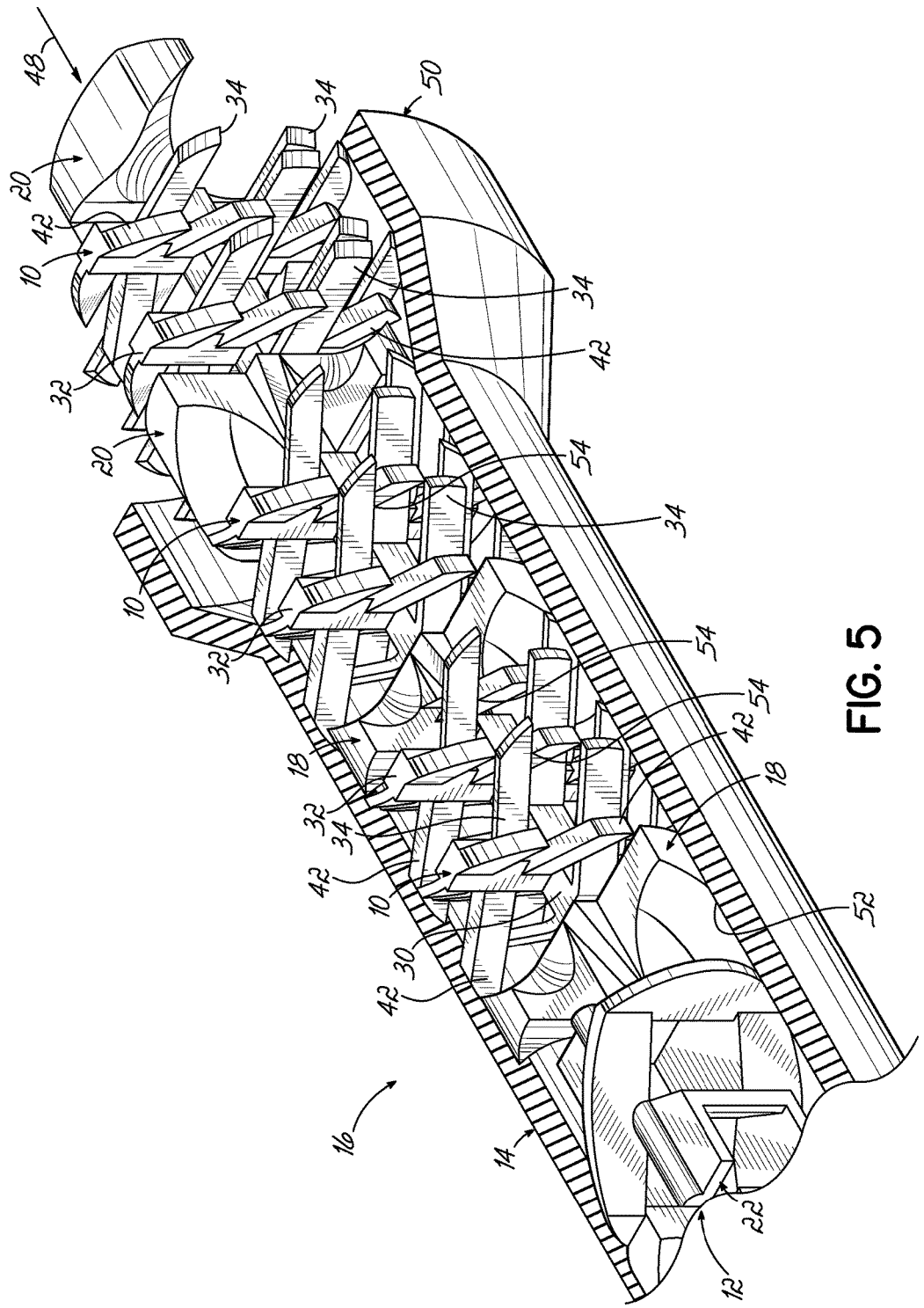
FIG. 5 is a perspective view of a static mixer incorporating the baffle stack of FIG. 1, while the baffle stack is inserted into a tubular conduit.

As shown in FIGS. 1-4 and partially in FIG. 5, the reconfigurable mixing baffles 10 included in the baffle stack 12 are molded in a first configuration that is suitable for molding in series with other baffles 18, 20, 22. In this regard, the reconfigurable mixing baffles 10 do not include a high number of undercuts and interlaced mixing elements in the first configuration. As a result, the reconfigurable mixing baffles 10 may be molded in series with other mixing baffles 10 and other conventional baffles 18, 20, 22 by non-specialized, regular molding equipment. When the reconfigurable mixing baffles 10 are inserted into a tubular conduit such as the mixer conduit 14 shown in FIG. 5, the mixing baffles 10 move to a second configuration that is optimized for efficient mixing of fluids passing through the mixer conduit 14. In the second configuration as shown in FIGS. 6-9, the reconfigurable mixing baffle 10 defines a plurality of undercuts and/or an interlaced structure of mixing elements. To this end, the reconfigurable mixing baffle 10 is highly difficult or impossible to mold in the second configuration. Thus, the reconfigurable mixing baffle 10 enables baffles with complex geometries that are not directly moldable to be molded in series with other mixing baffles.

Figure 2:
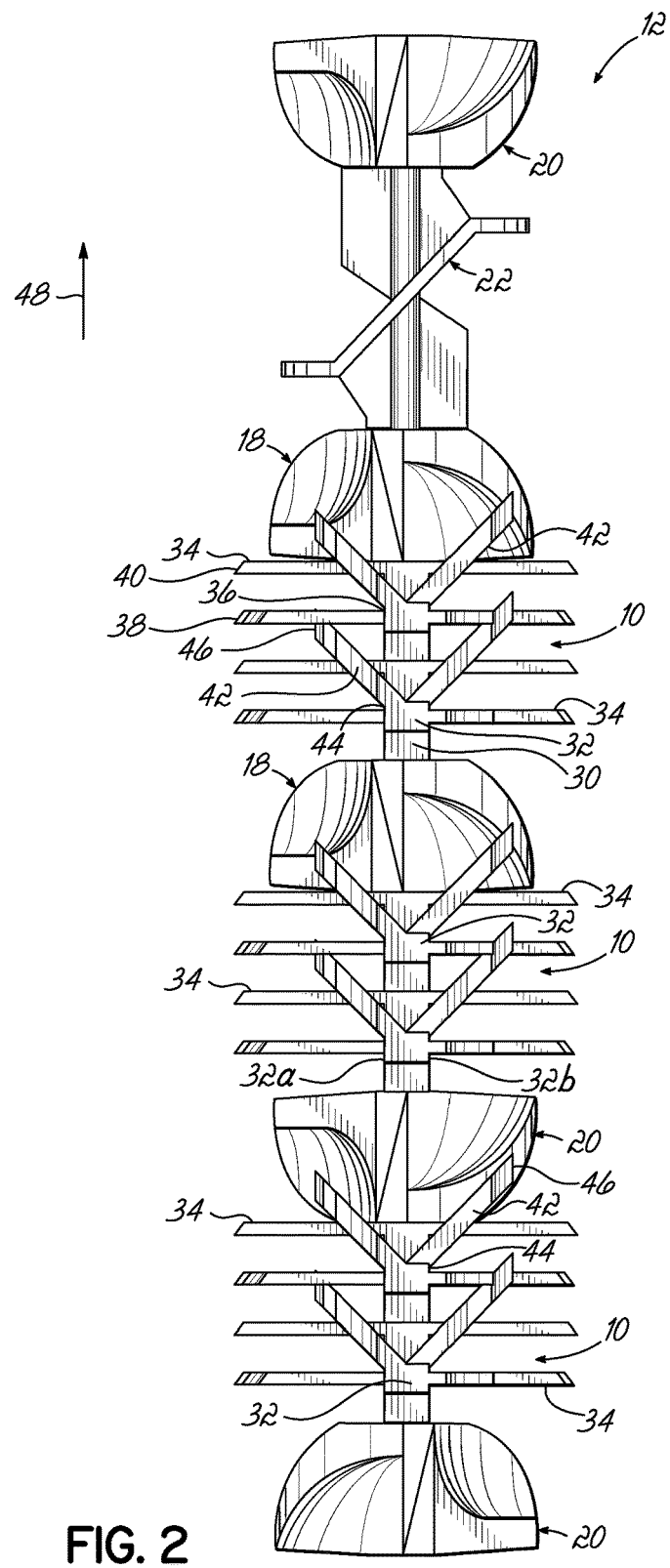
FIG. 2 is a side view of the baffle stack of FIG. 1.

With reference to FIGS. 1-4, a reconfigurable mixing baffle 10 according to this embodiment includes a mixing element support structure 30 in the form of a longitudinal bar 30 extending along a longitudinal direction defined by the baffle stack 12 when the mixing baffle 10 is molded into the baffle stack 12. It will be understood that other types of structure may be used for the mixing element support structure 30 in other embodiments of the invention. FIGS. 1 and 2 show a plurality of these mixing baffles 10 in a baffle stack 12, while FIGS. 3 and 4 show at least a portion 10a of the mixing baffle 10. The mixing baffle 10 also includes one or more cross bars 32 coupled to the longitudinal bar 30 and extending generally perpendicular to the longitudinal direction. Projecting outwardly from the longitudinal bar 30 and the cross bars 32 are a first set of moveable mixing elements 34 (hereinafter "first set of mixing elements" 34) which extend generally perpendicular to the longitudinal direction and generally perpendicular to the cross bars 32. Each of the first set of mixing elements 34 is integrally molded with the longitudinal bar 30 or the cross bars 32. Each of the first set of mixing elements 34 extends farther outwardly from the longitudinal bar 30 than the cross bars 32, for reasons set forth in further detail below. Each mixing element 34 includes an inner end 36 connected to the longitudinal bar 30 directly or via the corresponding cross bar 32 and an outer end 38 including a chamfered surface 40. The chamfered surface 40 is configured to align with and frictionally engage the tubular conduit 14 of a static mixer 16 as described in further detail below.

The reconfigurable mixing baffle 10 of this embodiment also includes a second set of stationary mixing elements 42 coupled to the longitudinal bar 30 or the cross bars 32. Each of the second set of mixing elements 42 includes an inner end 44 connected to the corresponding cross bar 32 or the longitudinal bar 30 and an outer end 46. The outer ends 46 of the stationary mixing elements 42 and the chamfered surfaces 40 on the outer ends 38 of the first set of mixing elements 34 are rounded so that the reconfigurable mixing baffle 10 may fit into a cylindrical tubular conduit 14. It will be understood that the respective outer ends 38, 46 may not be curved in other embodiments where the tubular conduit 14 is reshaped to be rectangular in cross section or another shape in cross section. In this embodiment, each of the second set of mixing elements 42 is angled from a plane transverse to the longitudinal direction towards an insertion direction indicated by arrow 48 in the figures. Thus, the cross bar 32 shown in FIG. 3 includes stationary mixing elements 42 and mixing elements formed adjacent to each other in alternating relation along opposed sides 32a, 32b of the cross bar 32.

As a result, the mixing baffle 10 defines a first configuration as molded in which the number of abutments or intersections between the mixing elements 34 and the stationary mixing elements 42 is minimized. To this end, the mixing baffle 10 does not include a high number of undercuts that are difficult to mold and impossible to mold in series with other baffles in a baffle stack 12. Thus, the mixing baffle 10 may be formed by a molding process so that the longitudinal bar 30, the cross bars 32, the first set of mixing elements 34, and the second set of mixing elements 42 are integrally formed as a unitary mixing baffle 10. Additionally, the mixing baffle 10 may be molded integrally with different types of mixing baffles having various orientations as shown in the unitary baffle stack 12 shown in FIGS. 1 and 2. In one example, the mixing baffle 10 and unitary baffle stack 12 may be injection molded from a moldable plastic material such as polypropylene. It will be understood that the mixing baffle 10 may be molded from different materials in other embodiments consistent with the invention. It will also be understood that while the mixing elements 34, 42 shown in this embodiment are blades, other types of mixing elements such as fins, wedges, webs, plates, etc. may be used as the mixing elements 34, 42 in other embodiments within the scope of the invention.

In order to move the first set of mixing elements 34 of the reconfigurable mixing baffle 10 from the first configuration to a second configuration better suited to mixing fluids, the mixing baffle 10 is inserted into a tubular conduit 14. For example, the baffle stack 12 including the mixing baffles 10 may be inserted into the inlet end 50 of the tubular conduit 14 of a static mixer 16 as shown in FIG. 5. As described above, the cross bars 32 of the mixing baffles 10 are shorter in transverse length than the reconfigurable mixing elements 34. More particularly, the cross bars 32 are sized to just frictionally engage the interior wall 52 of the tubular conduit 14. Because the first set of mixing elements 34 extends farther away from the longitudinal bar 30, the insertion of the mixing baffle 10 into the tubular conduit 14 forces each of the first set of mixing elements 34 to elastically deform or otherwise move from the first configuration (FIGS. 1-4) to the second configuration (FIGS. 6-9). For example, the first set of mixing elements 34 may be formed entirely from a deformable plastic material that is thin enough to deform as the mixing baffle 10 is inserted. Alternatively, the first set of mixing elements 34 may be formed with living hinge structures that allow pivotal movement of the mixing elements 34 even though portions thereof are rigid.

Regardless of the mechanism used to enable movement of the first set of mixing elements 34, the mixing elements 34 pivot towards and away from the longitudinal direction during insertion into the tubular conduit 14. In this embodiment, the elastic deformation of the first set of mixing elements 34 happens automatically as a result of inserting the baffle stack 12 into the static mixer 16, and no further manufacturing or assembly steps are required to prepare the mixing baffles 10 for use in the static mixer 16. To this end, the assembly of the static mixer 16 including these reconfigurable mixing baffles 10 is no more complex or time consuming than the assembly of a conventional baffle stack into a static mixer. It will be understood that the first set of mixing elements 34 may alternatively undergo inelastic or plastic deformation, or other movements, in some embodiments within the scope of the invention.

As shown most clearly in FIGS. 6-9, the first set of mixing elements 34 bends from the perpendicular orientation of the first configuration to an angled orientation with respect to the longitudinal direction in the second configuration. In this regard, each of the first set of mixing elements 34 defines an element length $L_E$ (most clearly shown in FIG. 4) measured from a center of the longitudinal bar 30 to the outer end 38, this element length $L_E$ being longer than half of the inner diameter $ID_C$ of the tubular conduit 14. As a result, the first set of mixing elements 34 is deflected upon insertion into the tubular conduit 14 so as to be angled from a plane transverse to the longitudinal direction away from the insertion direction indicated by arrow 48. The first set of mixing elements 34 moves from a first angle with respect to the longitudinal direction to a second angle with respect to the longitudinal direction, the second angle being smaller than the first angle. As a result of this elastic deformation or bending away from the insertion direction, the first set of mixing elements 34 meshes with the adjacent second set of mixing elements 42, which remain angled towards the insertion direction as the mixing baffle 10 is inserted into the tubular conduit 14. Thus, the first set of mixing elements 34 and the second set of mixing elements 42 form an interlaced or lattice structure of mixing elements in the second configuration. This lattice structure is defined by a plurality of undercuts and a plurality of intersection joints 54 formed between adjacent mixing elements 34, 42. Consequently, the regular molding process for molding the mixing baffle 10 as a part of the unitary baffle stack 12 could not successfully mold the mixing baffle 10 in this second configuration. The high number of undercuts and joints 54 in the second configuration would prevent the mixing baffle 10 from reliably releasing from a mold in the second configuration. In summary, the reconfigurable mixing baffle 10 moves from a moldable first configuration to a second configuration that is difficult or impossible to mold when the mixing baffle 10 is inserted into the tubular conduit 14.

The lattice structure formed by the mixing elements 34, 42 of the mixing baffle 10 advantageously mixes two or more fluids passing through the mixing baffle 10 more thoroughly over a shorter length than a conventional mixing baffle that divides the flow into only two portions, such as the left-handed mixing baffle 18 and the right-handed mixing baffle 20. As fluid flows through the mixing baffle 10, the flow is subdivided into numerous portions by the first set of mixing elements 34 and the second set of mixing elements 42. In this regard, the fluid flows through the equivalent of two comb-like structures intermeshed with one another repeatedly, which causes a single mass flow to become a high number of sub-flows that later recombine as a mixed flow. When combined with other mixing baffles that rotate and divide the flow (such as the left-handed mixing baffle 18 and the right-handed mixing baffle 20) into a baffle stack 12, the mixing baffles 10 enable thorough mixing of two or more fluids in a static mixer 16 with a shorter length than would be required if only left-handed mixing baffles 18 and right-handed mixing baffles 20 were used. Thus, the mixing baffle 10 is well suited to mixing fluid flow in the second configuration.

Figure 6:
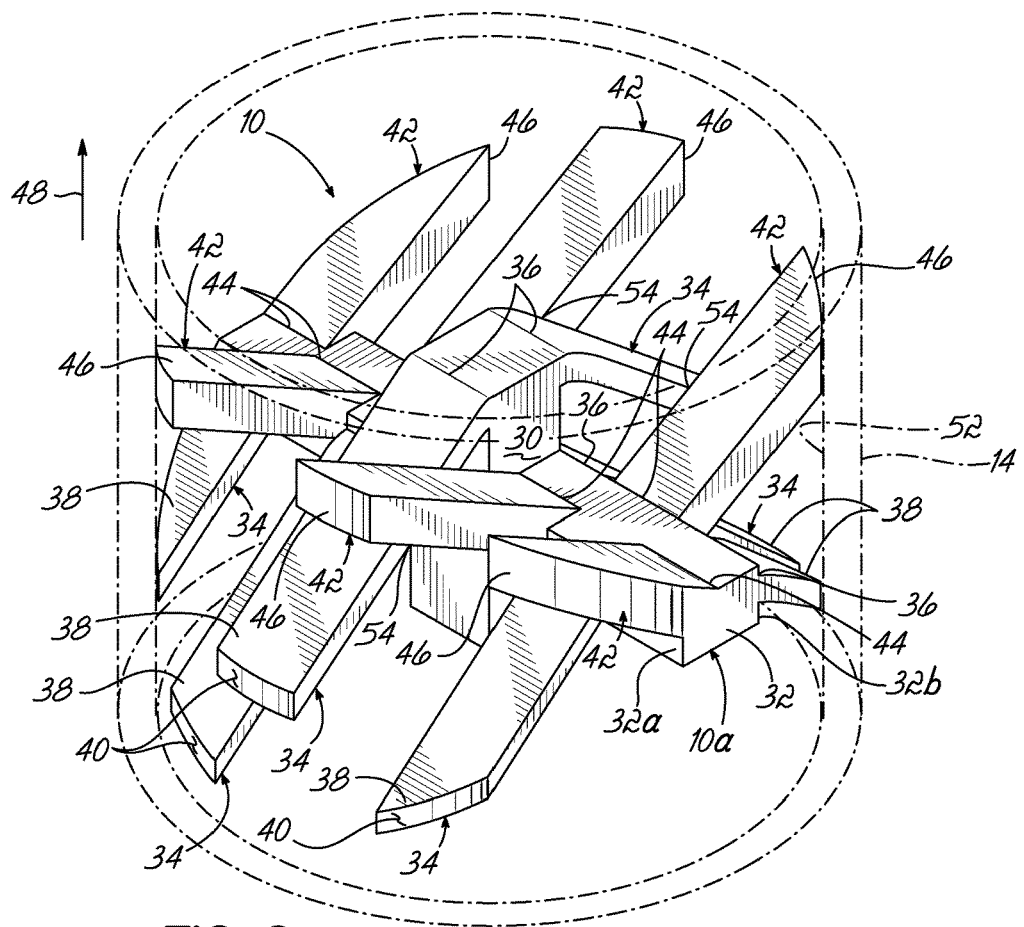
FIG. 6 is a perspective view of the mixing baffle of FIG. 3 positioned in a second configuration after insertion into a tubular conduit.
Figure 7:
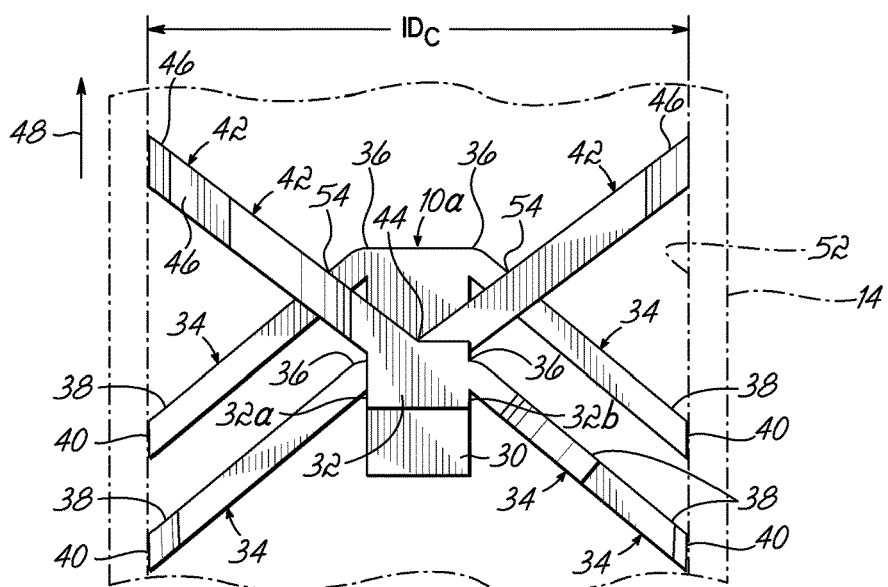
FIG. 7 is a side view of the mixing baffle of FIG. 6 in the second configuration.
Figure 8:
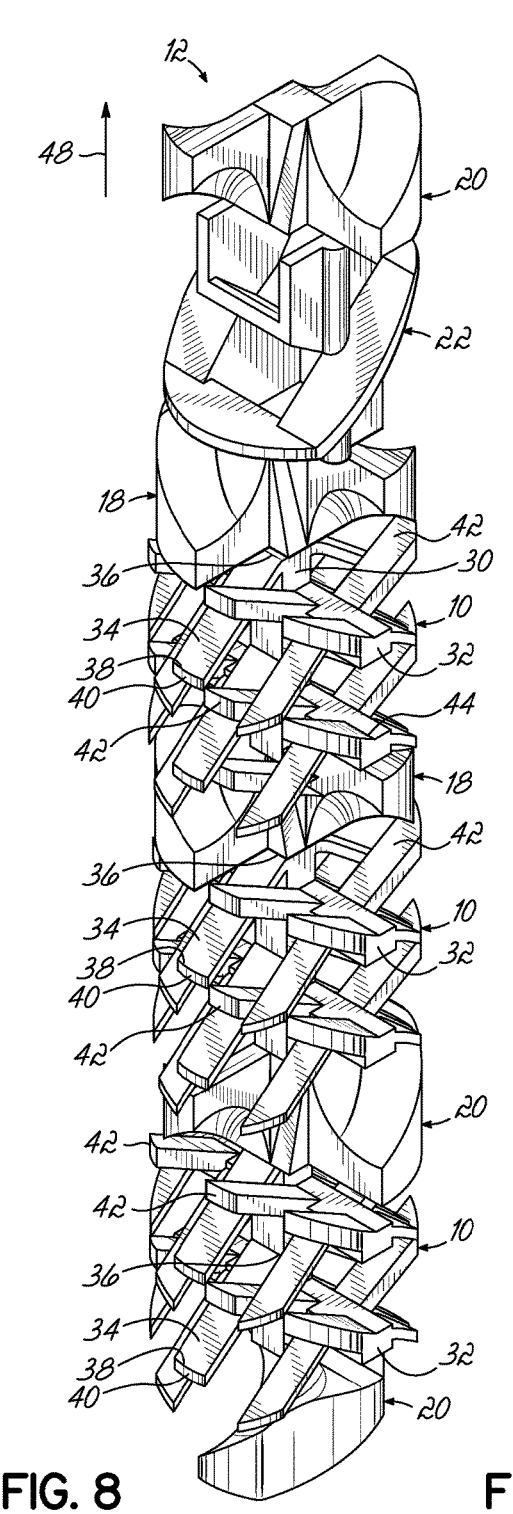
FIG. 8 is a perspective view of the baffle stack of FIG. 1 including the mixing baffle in the second configuration optimized for mixing.
Figure 9:
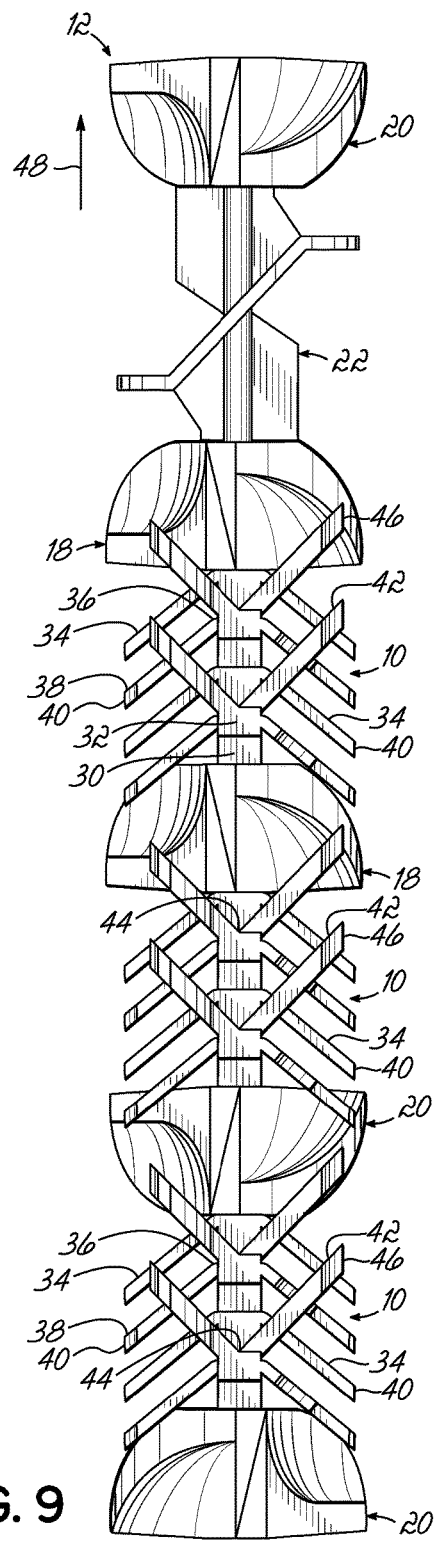
FIG. 9 is a side view of the baffle stack of FIG. 8.

As shown most clearly in FIGS. 6 and 7, the chamfered surfaces 40 at the outer ends 38 of the first set of mixing elements 34 pivot into frictional engagement with the interior wall 52 of the tubular conduit 14 when the first set of mixing elements 34 is moved to the second configuration. Thus, the mixing baffle 10 advantageously provides an operable frictional engagement of the mixing elements 34, 42 and the tubular conduit 14 regardless of the tolerance used to form the first set of mixing elements 34. Any tolerance inconsistencies in the mixing elements 34 are negated by the elastic deformation of the mixing elements 34 to exactly fit the size of the tubular conduit 14 as the mixing baffle 10 is inserted into the tubular conduit 14. To this end, the reconfigurable mixing baffle 10 eliminates the problem that inconsistent tolerances of mixing baffles may lead to interference fits with the tubular conduit 14 of the static mixer 16, which renders the baffle stack 12 difficult to insert into the tubular conduit 14. Additionally, the automatic frictional engagement of the mixing baffle 10 and the tubular conduit 14 enables the baffle stack 12 to be reliably inserted into the static mixer 16 using a pneumatic pusher rod and relatively low insertion forces as understood in the art. In addition, this friction fit will prevent the baffle stack 12 from falling out of the tubular conduit 14 during transit, storage, and use of the static mixer 16.

The specific angles at which the first set of mixing elements 34 deform or move is controllable by modifying the element length $L_E$ of each mixing element 34. For example, if the mixing elements 34 shown in FIG. 7 were increased in length from the inner end 36 to the outer end 38, the insertion of the mixing baffle 10 into the tubular conduit 14 would force the mixing elements 34 to deflect at a greater angle than the one shown in FIG. 7. Similarly, if the mixing elements 34 were decreased in length from the inner end 36 to the outer end 38, the angle of bend caused by insertion into the tubular conduit 14 would be less than that shown in FIG. 7. To this end, the molding and insertion of the mixing baffle 10 into the tubular conduit 14 can result in any mixing element orientation or angle that would normally be achieved by undercuts in molding processes. Furthermore, the type of elastic deformation can be modified by redesigning the mixing elements 34, as discussed below with reference to the alternative embodiments in FIGS. 10-19. It will be understood that the element length $L_E$ remains longer than one half of the inner diameter $ID_C$ of the tubular conduit 14 in these embodiments in order to automatically cause the mixing baffles 10 to take the second configuration upon insertion into the tubular conduit 14.

Consequently, a static mixer 16 including mixing baffles 10 with a first set of mixing elements 34 that define a plurality of undercuts that are difficult to mold may be manufactured by the following process. A baffle stack 12 is molded to include at least one of the mixing baffles 10 with a longitudinal bar 30 and a first set of mixing elements 34 in a first configuration. The baffle stack 12 is then inserted into a tubular conduit 14. As the baffle stack 12 is inserted into the tubular conduit 14, the first set of mixing elements 34 is moved from the first configuration to a second configuration that includes the plurality of undercuts, thereby rendering the mixing baffle 10 ready for mixing fluid flow in the static mixer 16.

It will be understood that the mixing baffles 10 may be moved to the second configuration using other methods before being inserted into the tubular conduit 14 of the static mixer 16. For example, the baffle stack 12 could be inserted into a separate tube (not shown) having a similar size as the tubular conduit 14 to elastically deform or otherwise move the first set of mixing elements 34 to the second configuration, and then the baffle stack 12 could be pushed out of the separate tube in an opposite direction directly into the tubular conduit 14 of the static mixer 16. Using this alternative process, the first set of mixing elements 34 may be disposed in the static mixer 16 so as to be angled towards the insertion direction rather than away from the insertion direction. Other alternative methods of elastically deforming or otherwise moving the mixing elements 34 to their second configuration are also possible within the scope of this invention.

Thus, the mixing baffle 10 addresses the problems of manufacturing a static mixer 16 with mixing elements or elements that define a plurality of undercuts which are impossible to mold in series with an entire baffle stack 12. The mixing baffle 10 automatically frictionally engages the tubular conduit 14 of the static mixer 16, removing any insertion difficulties produced by varying mixing element tolerances. The mixing baffle 10 is moved to the second configuration, which is difficult or impossible to mold, as a result of insertion into a tubular conduit 14, thereby removing any additional manufacturing or assembly steps required to generate the static mixer 16. The inclusion of the reconfigurable mixing baffles 10 increases the mixing effectiveness of the baffle stack 12 and enables an advantageous overall reduction of the length of the static mixer.

An alternative embodiment of the mixing baffle 100 is illustrated in FIGS. 10-15. Each mixing baffle 100 includes one or more of the repeating mixing baffle portions 100a shown in detail in FIG. 10. Similar to the first embodiment of the mixing baffle 10, the mixing baffle 100 is molded in a first configuration and is configured to move to a second or third configuration optimized for mixing fluids when the mixing baffle 100 is inserted into a tubular conduit (not shown). In the second and third configurations, the mixing elements defining the mixing baffle 100 define a plurality of undercuts that are difficult or impossible to mold in series with other mixing baffles.

Figure 11:
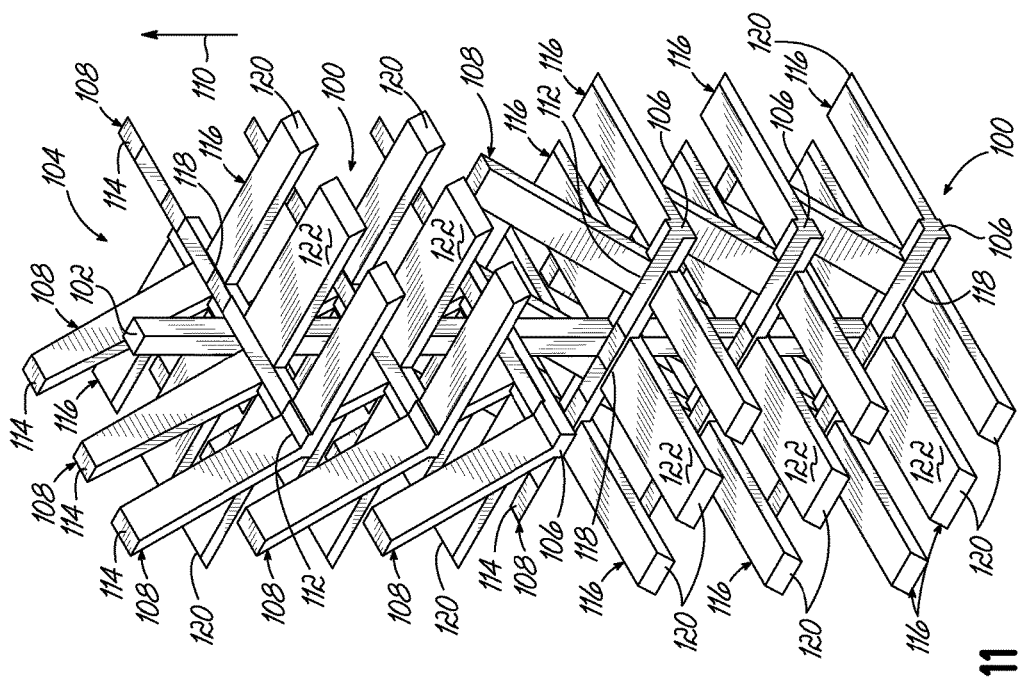
FIG. 11 is a perspective view of a plurality of the mixing baffles of FIG. 10 in a baffle stack.
Figure 10:
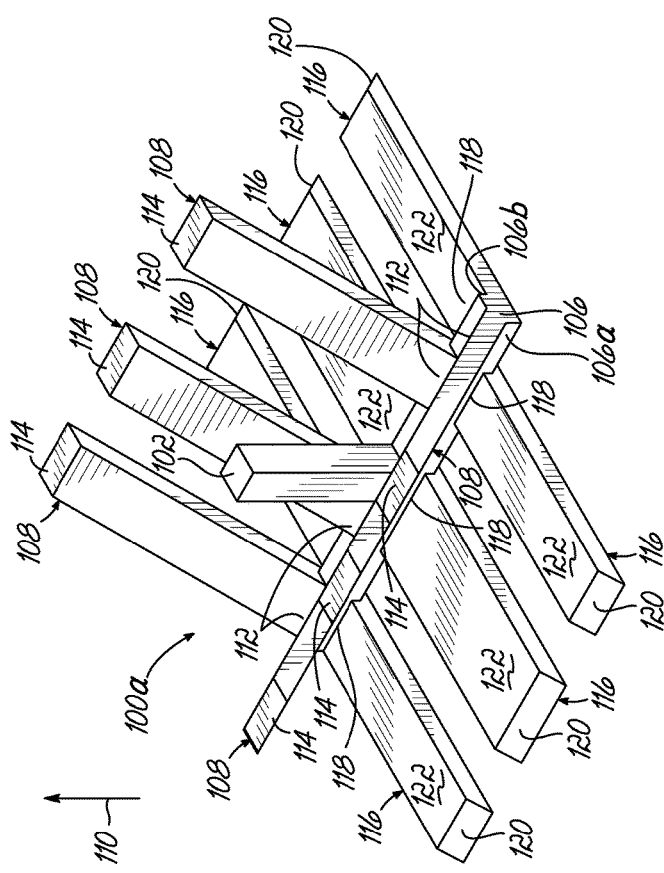
FIG. 10 is a perspective view of at least a portion of a mixing baffle according to another embodiment of the current invention, the mixing baffle positioned in a first configuration.
Figure 13:
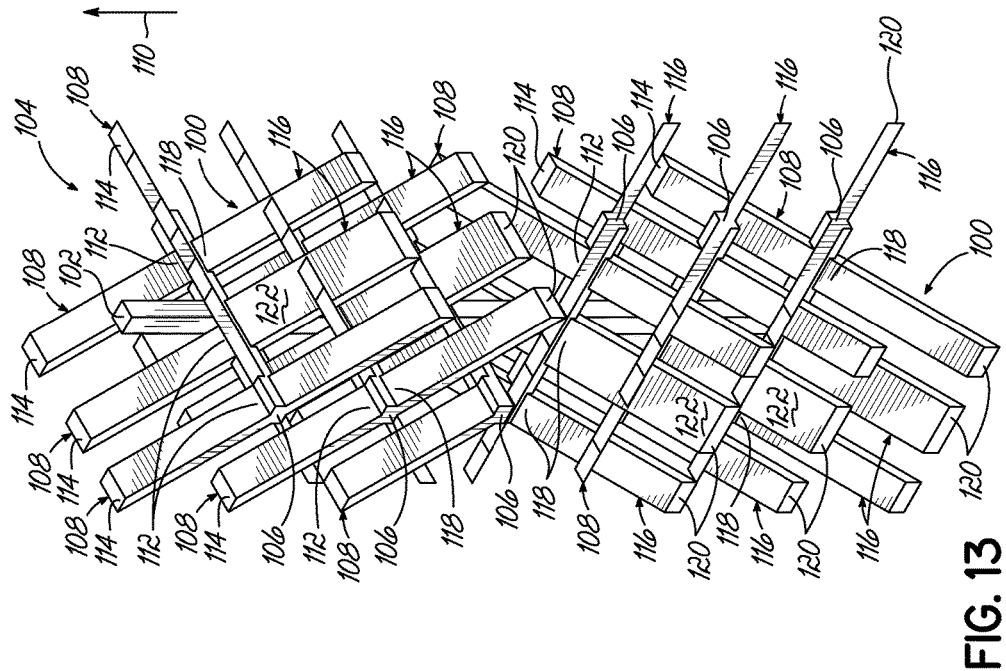
FIG. 13 is a perspective view of a plurality of the mixing baffles of FIG. 12 in a baffle stack.
Figure 12:
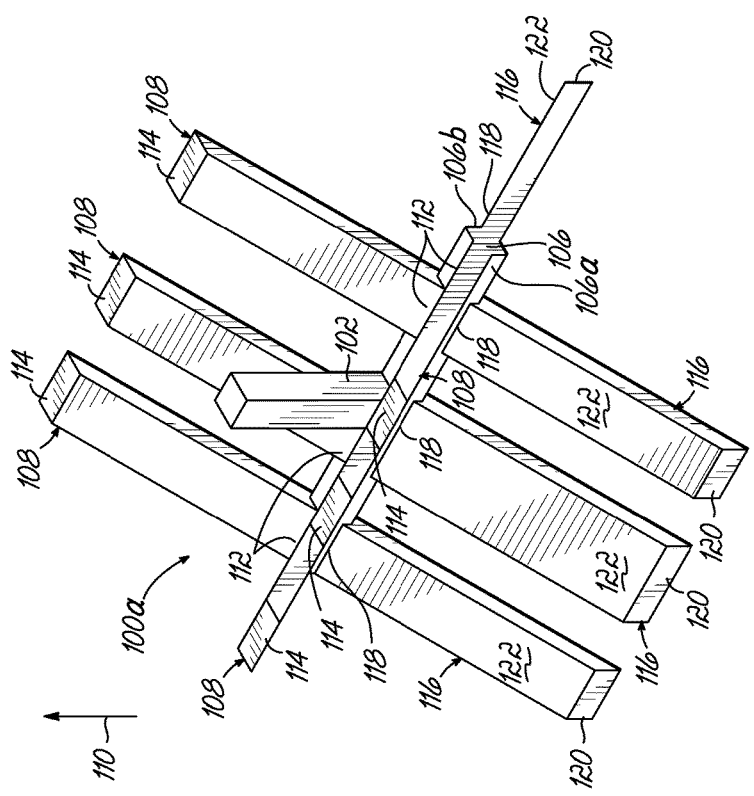
FIG. 12 is a perspective view of the mixing baffle of FIG. 10 positioned in a second configuration optimized for mixing.
Figure 15:
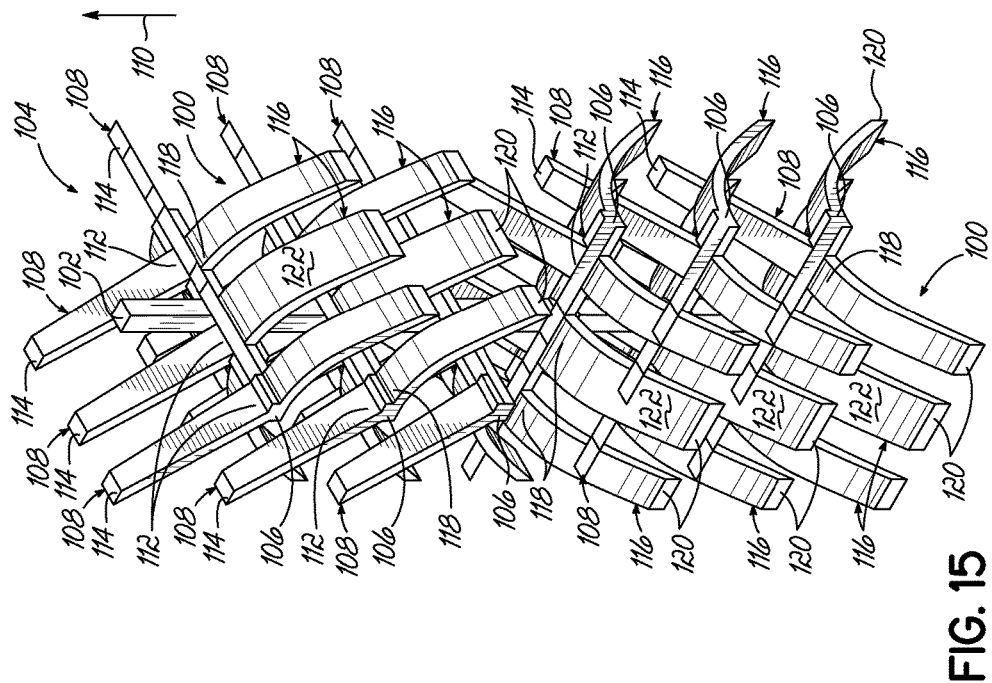
FIG. 15 is a perspective view of a plurality of the mixing baffles of FIG. 14 in a baffle stack.
Figure 14:
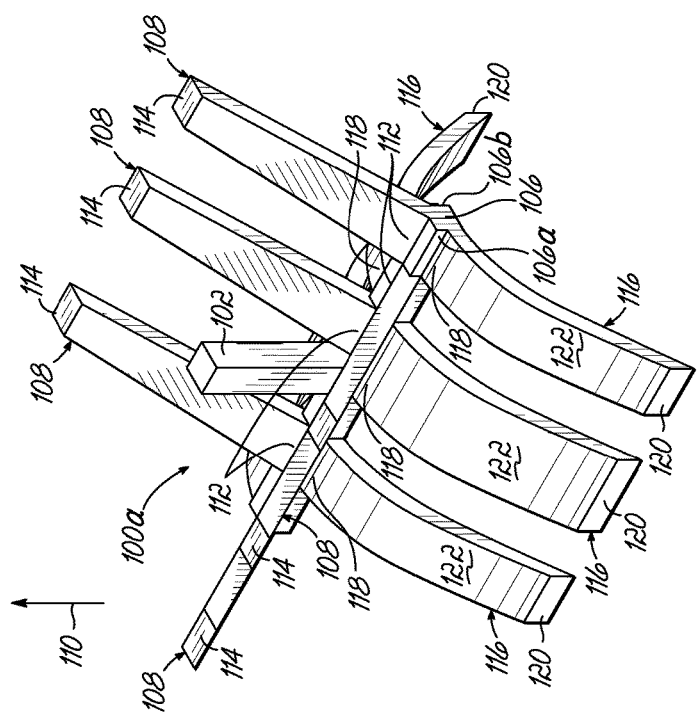
FIG. 14 is a perspective view of the mixing baffle of FIG. 10 positioned in a third configuration optimized for mixing.

With reference to FIG. 10, the mixing baffle 100 in the first configuration includes a mixing element support structure 102 in the form of a longitudinal bar 102 extending in a longitudinal direction as defined by the baffle stack 104 shown in FIG. 11. The mixing baffle 100 also includes at least one cross bar 106 extending perpendicular to the longitudinal direction. Each cross bar 106 connected to the longitudinal bar 102 of a single mixing baffle 100 is oriented in the same direction and is parallel to the other cross bars 106. A second set of stationary mixing elements 108 extends in alternating relation from opposed sides 106a, 106b of the cross bar 106. The second set of mixing elements 108 extends towards an insertion direction indicated by arrow 110 from inner ends 112 at the cross bar 106 to outer ends 114. The second set of mixing elements 108 therefore produces a V-shaped comb-like portion of the mixing baffle 100.

The mixing baffle 100 also includes a first set of moveable mixing elements 116 (hereinafter first set of mixing elements 116) extending in alternating relation from the opposed sides 106a, 106b of the cross bar 106. The first set of mixing elements 116 extends generally perpendicular to the longitudinal direction and generally perpendicular to the cross bar 106, from inner ends 118 at the cross bar 106 to outer ends 120. Each of the first set of mixing elements 116 also includes a deflection face 122 oriented towards the insertion direction indicated by arrow 110. To this end, each of the mixing elements 116 is generally planar and does not intermesh with other mixing elements in the first configuration as molded, thereby reducing or eliminating any undercuts that are difficult to mold in series with other mixing baffles.

As shown in FIG. 11, multiple mixing baffle portions 100a are positioned adjacent to one another along the longitudinal direction to form the mixing baffle 100. Also as shown in FIG. 11, two adjacent mixing baffles 100 in the baffle stack 104 may be reoriented with respect to one another 90 degrees or some other angle such that the mixing elements 108, 116 change orientation from one mixing baffle 100 to the next. This reorientation of adjacent mixing baffles 100 improves the efficiency or mixing thoroughness per unit length of the baffle stack 104. It will be understood that while the various mixing elements 108, 116 do not have rounded edges and are configured to be inserted into a rectangular tubular conduit, the mixing elements 108, 116 could be reconfigured in other embodiments of the invention so as to fit in tubular conduits of cylindrical or other shapes.

Each of the first set of mixing elements 116 extends farther outwardly from the cross bar 106 than the corresponding second set of mixing elements 108. Thus, when the mixing baffle 100 is inserted into a tubular conduit, the tubular conduit elastically (or plastically) deforms the first set of mixing elements 116 from the generally perpendicular first configuration to either a generally planar angled second configuration shown in FIGS. 12 and 13 or a generally non-planar arcuate third configuration shown in FIGS. 14 and 15. In this regard, the deflection face 122 of each mixing element 116 abuts the tubular conduit and is forced inwardly towards the longitudinal bar 102 as the mixing baffle 100 is inserted into the tubular conduit. In other words, each mixing element 116 is bent away from the insertion direction to a more angled (FIGS. 12 and 13) or arcuate (FIGS. 14 and 15) shape. Various factors may determine whether the first set of mixing elements 116 deforms into the planar angled second configuration or the arcuate third configuration, including but not limited to: elasticity of the material forming the mixing elements 116, the size of the tubular conduit, and other factors. Similar to the first embodiment, the bending of the first set of mixing elements 116 produces a frictional engagement between the mixing elements 116 and the tubular conduit at the deflection faces 122. The first set of mixing elements 116 may also intermesh with the second set of mixing elements 108 in the second and third configurations. As a result, the mixing baffle 100 defines a plurality of undercuts in the second and third configurations that are difficult if not impossible to mold in that second or third configuration. The mixing baffle 100 is optimized for mixing in both the second and third configurations. Thus, the mixing baffles 100 enable the generation of a baffle stack 104 by molding that would not have been moldable if the first set of mixing elements 116 were molded in the second configuration.

Figure 17:
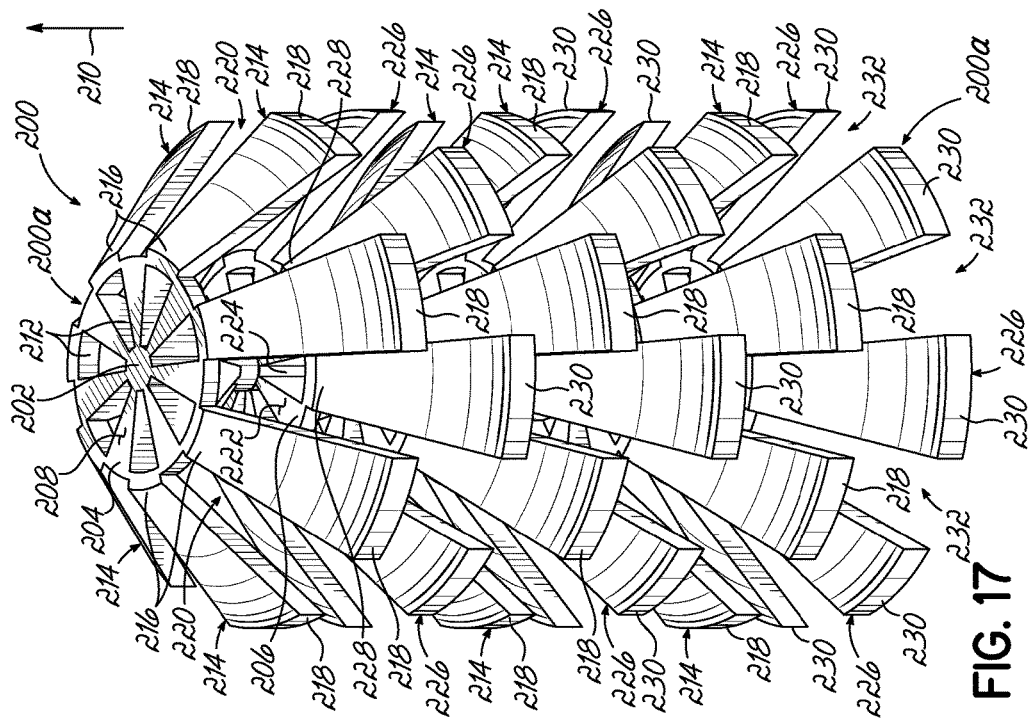
FIG. 17 is a perspective view of the mixing baffle of FIG. 16 positioned in a second configuration optimized for mixing.
Figure 16:
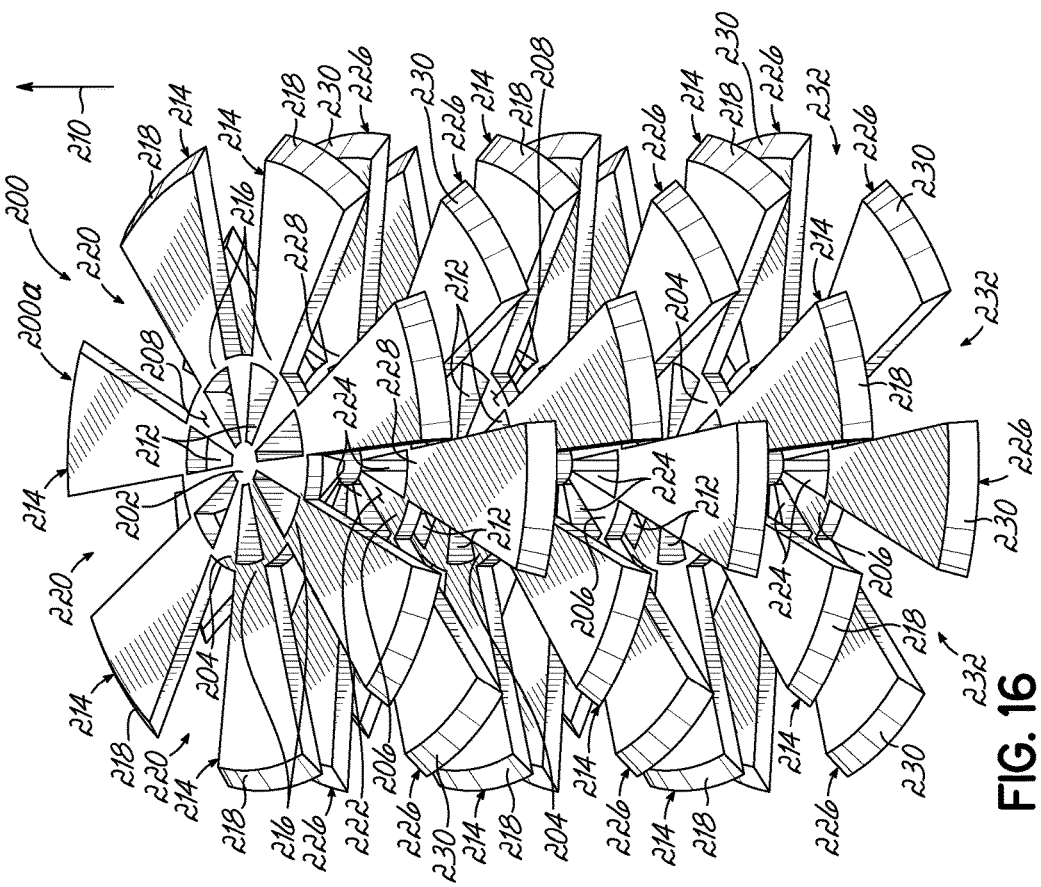
FIG. 16 is a perspective view of a mixing baffle according to another embodiment of the current invention, the mixing baffle positioned in a first configuration.

Another embodiment of a mixing baffle 200 in accordance with the invention is shown in FIGS. 16 and 17. Similar to the first embodiment of the mixing baffle 10, the mixing baffle 200 is molded in a first configuration (FIG. 16) and is configured to move to a second configuration (FIG. 17) optimized for mixing fluids when the mixing baffle 200 is inserted into a tubular conduit (not shown). In the second configuration, the mixing elements defining the mixing baffle 200 define a plurality of undercuts that are difficult or impossible to mold in series with other mixing baffles.

Referring to FIG. 16, the mixing baffle 200 is composed of a plurality of repeating mixing baffle portions 200a. Each mixing baffle portion 200a includes a mixing element support structure 202 in the form of a longitudinal bar 202 extending in a longitudinal direction, a first conical portion 204 surrounding the longitudinal bar 202, and a second conical portion 206 adjacent to the first conical portion 204 and surrounding the longitudinal bar 202. The first conical portion 204 includes an end surface 208 facing towards a direction of insertion indicated by arrow 210. The first conical portion 204 tapers in cross-sectional dimension from the end surface 208 towards the second conical portion 206. The first conical portion 204 also includes a plurality of through apertures 212 configured to permit flow through the center portion of the mixing baffle 200. The mixing baffle 200 includes a first set of moveable mixing elements 214 extending radially outwardly in a direction perpendicular to the longitudinal direction from inner edges 216 to outer edges 218. Each of the first set of mixing elements 214 is spaced from one another so as to define first gaps 220 for fluid flow between the mixing elements 214.

In a similar manner, the second conical portion 206 includes an end surface 222 facing towards a direction of insertion indicated by arrow 210. The second conical portion 206 tapers in cross-sectional dimension from the end surface 222 away from the first conical portion 204. The second conical portion 206 also includes a plurality of through apertures 224 configured to permit flow through the center portion of the mixing baffle 200. The mixing baffle 200 includes a second set of moveable mixing elements 226 extending radially outwardly in a direction perpendicular to the longitudinal direction from inner edges 228 to outer edges 230. Each of the second set of mixing elements 226 is spaced from one another so as to define second gaps 232 for fluid flow between the mixing elements 226. The first set of mixing elements 214 is generally aligned with the second gaps 232, and the second set of mixing elements 226 is generally aligned with the first gaps 220. It will be understood that the first and second pluralities of mixing elements 214, 226 could also be aligned at different rotational positions in other embodiments of the mixing baffle 200 within the scope of this invention.

The first and second pluralities of mixing elements 214, 226 are sized such that when the mixing baffle 200 is inserted into a tubular conduit, the tubular conduit elastically deforms the mixing elements 214, 226 from the perpendicular orientation of the first configuration to an angled orientation in a second configuration shown in FIG. 17. In this regard, each mixing element 214, 226 is forced inwardly towards the longitudinal bar 202 and away from the insertion direction as the mixing baffle 200 is inserted into the tubular conduit. Thus, the mixing elements 214, 226 move from a first angle with respect to the longitudinal direction to a second angle with respect to the longitudinal direction, the second angle being smaller than the first angle. Similar to the first embodiment, the bending of the first and second pluralities of mixing elements 214, 226 produces a frictional engagement between the outer edges 218, 230 of the mixing elements 214, 226 and the tubular conduit. Although the mixing elements 214, 226 do not intermesh as in previously-described embodiments, the mixing baffle 200 still defines a plurality of undercuts in the second configuration that present obstacles that can prevent molding. Thus, the mixing baffle 200 enables the generation of a baffle stack by molding that would not have been moldable if the first and second pluralities of mixing elements 214, 226 were molded in the second configuration.

Another embodiment of a mixing baffle 300 in accordance with the invention is shown in FIGS. 18 and 19. Similar to the first embodiment of the mixing baffle 10, the mixing baffle 300 is molded in a first configuration (FIG. 18) and is configured to move to a second configuration (FIG. 19) optimized for mixing fluids when the mixing baffle 300 is inserted into a tubular conduit (not shown). In the second configuration, the mixing elements defining the mixing baffle 300 define a plurality of undercuts that are difficult or impossible to mold in series with other mixing baffles.

Referring to FIG. 18, the mixing baffle 300 includes a mixing element support structure 302 in the form of a central frame 302 that extends along a longitudinal direction. The central frame 302 includes a plurality of cross bars 304 extending perpendicular to the longitudinal direction and a plurality of connecting bars 306 extending between adjacent pairs of cross bars 304. The mixing baffle 300 also includes a first set of moveable mixing elements 308 (hereinafter first set of mixing elements 308) extending from opposing sides 304a, 304b of each cross bar 304. The lateral positioning and the number of mixing elements 308 extending from each cross bar 304 may be varied without departing from the scope of the invention. Each of the mixing elements 308 extends perpendicular to the longitudinal direction in a first configuration from an inner edge 310 at the corresponding cross bar 304 to an outer edge 312 configured to abut a tubular conduit (not shown). Each of the mixing elements 308 also includes a deflection face 314 extending between the inner edge 310 and the outer edge 312, the deflection face 314 directed towards a direction of insertion indicated by arrow 316.

Each of the first set of mixing elements 308 is sized such that when the mixing baffle 300 is inserted into a tubular conduit, the tubular conduit elastically deforms the mixing elements 308 from the perpendicular and generally linear orientation of the first configuration to a generally non-planar arcuate orientation in a second configuration shown in FIG. 19. In this regard, the deflection face 314 of each mixing element 308 is forced inwardly towards the central frame 302 and away from the insertion direction as the mixing baffle 300 is inserted into the tubular conduit. Similar to the first embodiment, the bending of the mixing elements 308 produces a frictional engagement between the outer edges 312 of the mixing elements 308 and the tubular conduit. Although the mixing elements 308 do not intermesh as in previously-described embodiments, the mixing baffle 300 still defines a plurality of undercuts in the second configuration that present obstacles that can prevent molding. Thus, the mixing baffle 300 enables the generation of a baffle stack by molding that would not have been moldable if the first set of mixing elements 308 were molded in the second configuration.

While the present invention has been illustrated by a description of several embodiments, and while such embodiments have been described in considerable detail, there is no intention to restrict, or in any way limit, the scope of the appended claims to such detail. Additional advantages and modifications will readily appear to those skilled in the art. For example, the various embodiments of the mixing baffle 10, 100, 200, 300 can be adapted for use in any type of tubular mixer conduit, including rectangular-shaped and circular-shaped mixer conduits. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow.

What is claimed is:

1. A mixing baffle for mixing a fluid flow in a static mixer defining a longitudinal direction along a length thereof, the mixing baffle comprising:

a mixing element support structure including at least one first support element extending along the longitudinal direction and a second support element coupled to the at least one first support element and extending transverse to the longitudinal direction; and
a set of moveable mixing elements coupled to the second support element, the set of moveable mixing elements being formed in a first configuration; and
the set of moveable mixing elements moving from the first configuration to a second configuration when the mixing baffle is inserted into a tubular conduit, the set of moveable mixing elements defining a plurality of undercuts in the second configuration that prevent molding the mixing baffle in the second configuration, and the second support element remaining stationary and transverse to the longitudinal direction when the mixing baffle is inserted into the tubular conduit.

2. The mixing baffle of claim 1, each of the set of moveable mixing elements defining a deflection face oriented transverse to the longitudinal direction in the first configuration and extending with a width and a length between an inner end at the second support element and an outer end, the width and the length of the deflection face being larger than a thickness of the corresponding moveable mixing element so as to be configured to force fluid flow in the static mixer to mix by shifting into gaps defined between adjacent pairs of moveable mixing elements in the set of moveable mixing elements.

3. The mixing baffle of claim 2, the deflection faces and the gaps of the set of moveable mixing elements positioned such that when the mixing baffle is inserted with additional mixing baffles in the tubular conduit of the static mixer, the deflection faces align with gaps in the additional mixing baffles and the gaps align with deflection faces in the additional mixing baffles to ensure that the fluid flow in the static mixer divides and shifts at all portions of the tubular conduit.

4. The mixing baffle of claim 1, the at least one first support element including a longitudinal bar extending in the longitudinal direction, and the second support element including a conical portion coupled to and extending radially outwardly from the longitudinal bar in a direction perpendicular to the longitudinal direction.

5. The mixing baffle of claim 1, the second support element including a plurality of cross bars extending perpendicular to the longitudinal direction, the at least one first support element including a plurality of connecting bars extending between pairs of the plurality of cross bars, such that the plurality of cross bars and the plurality of connecting bars collectively define a central frame structure.

6. The mixing baffle of claim 1, the set of moveable mixing elements defining a discrete layer transverse to the longitudinal direction in the first configuration, and each of the set of moveable mixing elements bending in the same direction angled away from a direction of insertion in the second configuration when the mixing baffle is inserted into the tubular conduit, such that when the mixing baffle is inserted with additional mixing baffles in the static mixer, multiple discrete layers of sets of moveable mixing elements are each bent in the same direction in the static mixer.

7. The mixing baffle of claim 1, wherein the set of moveable mixing elements is angled from the longitudinal direction at a first angle in the first configuration, and the set of moveable mixing elements is angled from the longitudinal direction at a second angle smaller than the first angle in the second configuration.

8. The mixing baffle of claim 7, wherein the set of moveable mixing elements is perpendicular to the longitudinal direction in the first configuration, and the set of moveable mixing elements is angled at an acute angle from the longitudinal direction in the second configuration.

9. The mixing baffle of claim 1, wherein each of the set of moveable mixing elements elastically deforms from the first configuration to the second configuration when positioned in the tubular conduit.

10. The mixing baffle of claim 1, wherein each of the set of moveable mixing elements includes an inner end connected to the mixing element support structure and a chamfered outer end configured to frictionally engage the tubular conduit when the set of moveable mixing elements is in the second configuration after insertion into the tubular conduit.

11. A static mixer for mixing a fluid flow, comprising:
a tubular conduit defining a longitudinal direction along a length thereof; and
a plurality of mixing baffles inserted into the tubular conduit, each of the mixing baffles further comprising:
a mixing element support structure including at least one first support element extending along the longitudinal direction and a second support element coupled to the at least one first support element and extending transverse to the longitudinal direction; and
a set of moveable mixing elements coupled to the second support element, the set of moveable mixing elements being formed in a first configuration; and
the set of moveable mixing elements moving from the first configuration to a second configuration when the mixing baffle is inserted into the tubular conduit, the set of moveable mixing elements defining a plurality of undercuts in the second configuration that prevent molding the mixing baffle in the second configuration, and the second support element remaining stationary and transverse to the longitudinal direction when the mixing baffle is inserted into the tubular conduit.

12. The static mixer of claim 11, each of the set of moveable mixing elements defining a deflection face oriented transverse to the longitudinal direction in the first configuration and extending with a width and length between an inner end at the second support element and an outer end, the width and length of the deflection face being larger than a thickness of the corresponding moveable mixing element so as to be configured to force fluid flow in the static mixer to mix by shifting into gaps defined between adjacent pairs of moveable mixing elements in the set of moveable mixing elements.

13. The static mixer of claim 12, the deflection faces and the gaps of the set of moveable mixing elements positioned such that when the plurality of mixing baffles is inserted into the tubular conduit, the deflection faces of each mixing baffle align with gaps in others of the plurality of mixing baffles, and the gaps of each mixing baffle align with deflection faces in others of the plurality of mixing baffles, to ensure that the fluid flow in the static mixer divides and shifts at all portions of the tubular conduit.

14. The static mixer of claim 11, the at least one first support element including a longitudinal bar extending in the longitudinal direction and shared by the plurality of mixing baffles, and the second support element including a conical portion coupled to and extending radially outwardly from the longitudinal bar in a direction perpendicular to the longitudinal direction.

15. The static mixer of claim 11, the second support element including a plurality of cross bars extending perpendicular to the longitudinal direction, the at least one first support element including a plurality of connecting bars extending between pairs of the plurality of cross bars, such that the plurality of cross bars and the plurality of connecting bars collectively define a central frame structure shared by the plurality of mixing baffles.

16. The static mixer of claim 11, the set of moveable mixing elements defining a discrete layer transverse to the longitudinal direction in the first configuration, and each of the set of moveable mixing elements bending in the same direction angled away from a direction of insertion in the second configuration when the plurality of mixing baffles is inserted into the tubular conduit, such that the plurality of mixing baffles collectively define multiple discrete layers of sets of moveable mixing elements that are each bent in the same direction in the static mixer.

17. The static mixer of claim 11, wherein the plurality of mixing baffles is molded in series to form a unitary baffle stack.

18. The static mixer of claim 17, wherein the plurality of mixing baffles is molded in series with at least one different type of mixing baffle.

19. The static mixer of claim 11, wherein the set of moveable mixing elements is angled from the longitudinal direction at a first angle in the first configuration, and the set of moveable mixing elements is angled from the longitudinal direction at a second angle smaller than the first angle in the second configuration.

20. The static mixer of claim 19, wherein the set of moveable mixing elements is perpendicular to the longitudinal direction in the first configuration, and the set of moveable mixing elements is angled at an acute angle from the longitudinal direction in the second configuration.

21. The static mixer of claim 11, wherein each of the set of moveable mixing elements is sized to elastically deform from the first configuration to the second configuration when positioned in the tubular conduit.

22. The static mixer of claim 11, wherein each of the set of moveable mixing elements includes an inner end connected to the mixing element support structure and a chamfered outer end configured to frictionally engage the tubular conduit when the set of moveable mixing elements is in the second configuration after insertion into the tubular conduit.

23. The static mixer of claim 11, wherein the tubular conduit includes an inner diameter, each of the set of moveable mixing elements defines an element length, and the element length is longer than half of the inner diameter of the tubular conduit.

24. A method of manufacturing a static mixer, comprising:
molding a plurality of mixing baffles so that each of the plurality of mixing baffles includes:
a mixing element support structure including at least one first support element extending along a longitudinal direction and a second support element coupled to the at least one first support element and extending transverse to the longitudinal direction; and
a set of moveable mixing elements coupled to the second support element, the set of moveable mixing elements being formed in a first configuration;
inserting the plurality of mixing baffles into a tubular conduit that has a length extending along the longitudinal direction; and
moving the set of moveable mixing elements from the first configuration to a second configuration as the plurality of mixing baffles is inserted into the tubular conduit, the set of moveable mixing elements defining a plurality of undercuts in the second configuration that prevent molding the mixing baffle in the second configuration, and the second support element remaining stationary and transverse to the longitudinal direction when the mixing baffle is inserted into the tubular conduit.

25. The method of claim 24, wherein molding the plurality of mixing baffles further comprises:
forming each of the set of moveable mixing elements with a deflection face oriented transverse to the longitudinal direction in a first configuration, with gaps being located for flow between adjacent pairs of moveable mixing elements; and
orienting each of the plurality of mixing baffles such that the deflection faces of each mixing baffle align with gaps in others of the plurality of mixing baffles, and the gaps of each mixing baffle align with deflection faces in others of the plurality of mixing baffles, to ensure that the fluid flow in the static mixer divides and shifts at all portions of the tubular conduit.

26. The method of claim 24, wherein molding the plurality of mixing baffles further comprises:
forming the mixing element support structure such that the at least one first support element includes a longitudinal bar and shared by the plurality of mixing baffles, and such that the second support element includes a conical portion coupled to and extending radially outwardly from the longitudinal bar in a direction perpendicular to the longitudinal direction.

27. The method of claim 24, wherein molding the plurality of mixing baffles further comprises:
forming the mixing element support structure such that the second support element includes a plurality of cross bars extending perpendicular to the longitudinal direction, and such that the at least one first support element includes a plurality of connecting bars extending between pairs of the plurality of cross bars, such that the plurality of cross bars and the plurality of connecting bars collectively define a central frame structure shared by the plurality of mixing baffles.

28. The method of claim 24, wherein moving the set of moveable mixing elements from the first configuration to the second configuration further comprises:
bending each of the set of moveable mixing elements for the plurality of mixing baffles in the same direction so as to be angled away from a direction of insertion in the second configuration.

* * * * *